United States Patent [19]

Bromley et al.

[11] Patent Number: 4,672,541

[45] Date of Patent: Jun. 9, 1987

[54] VIDEO GAME WITH INTERACTIVE ENLARGED PLAY ACTION INSERTS

[75] Inventors: Eric Bromley, West Simsbury; Beverly D. Sustare, Wethersfield, both of Conn.

[73] Assignee: Coleco Industries, Inc., West Hartford, Conn.

[21] Appl. No.: 615,810

[22] Filed: May 31, 1984

[51] Int. Cl.⁴ .......................... A63F 9/00; A63F 7/06; G06F 15/44
[52] U.S. Cl. .................................... 364/410; 273/1 E; 273/85 G; 273/88
[58] Field of Search ........... 364/410; 273/85 G, 93 R, 273/88, DIG. 28, 185 B, 87 R, 1 E

[56] References Cited

U.S. PATENT DOCUMENTS

| 4,324,402 | 4/1982 | Klose | 273/88 |
| 4,372,557 | 2/1983 | Del Principe et al. | 273/88 |
| 4,462,594 | 7/1984 | Bromley et al. | 273/DIG. 28 X |
| 4,491,324 | 1/1985 | Yoshida | 273/85 G |
| 4,552,360 | 11/1985 | Bromley et al. | 273/85 G |
| 4,580,782 | 4/1986 | Ochi | 273/DIG. 28 X |

FOREIGN PATENT DOCUMENTS 0107981 5/1984 European Pat. Off. .... 273/DIG. 28

Primary Examiner—Jerry Smith
Assistant Examiner—Clark A. Jablon

[57] ABSTRACT

A method of operating a video game which comprises storing at least two different but related playfield displays and changing playfield displays in response to the player-initiated selection of a designated switch, representing a specific game action.

9 Claims, 9 Drawing Figures

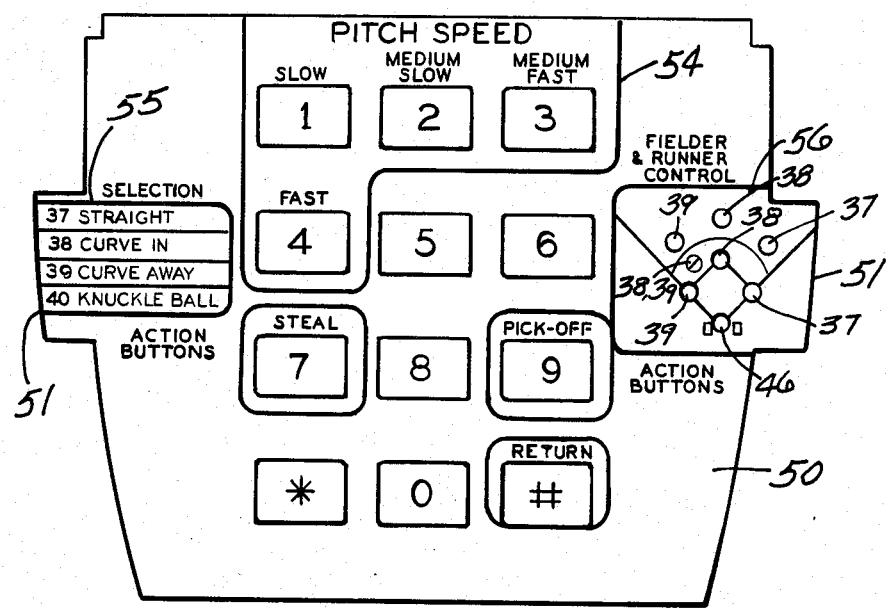
FIG-7
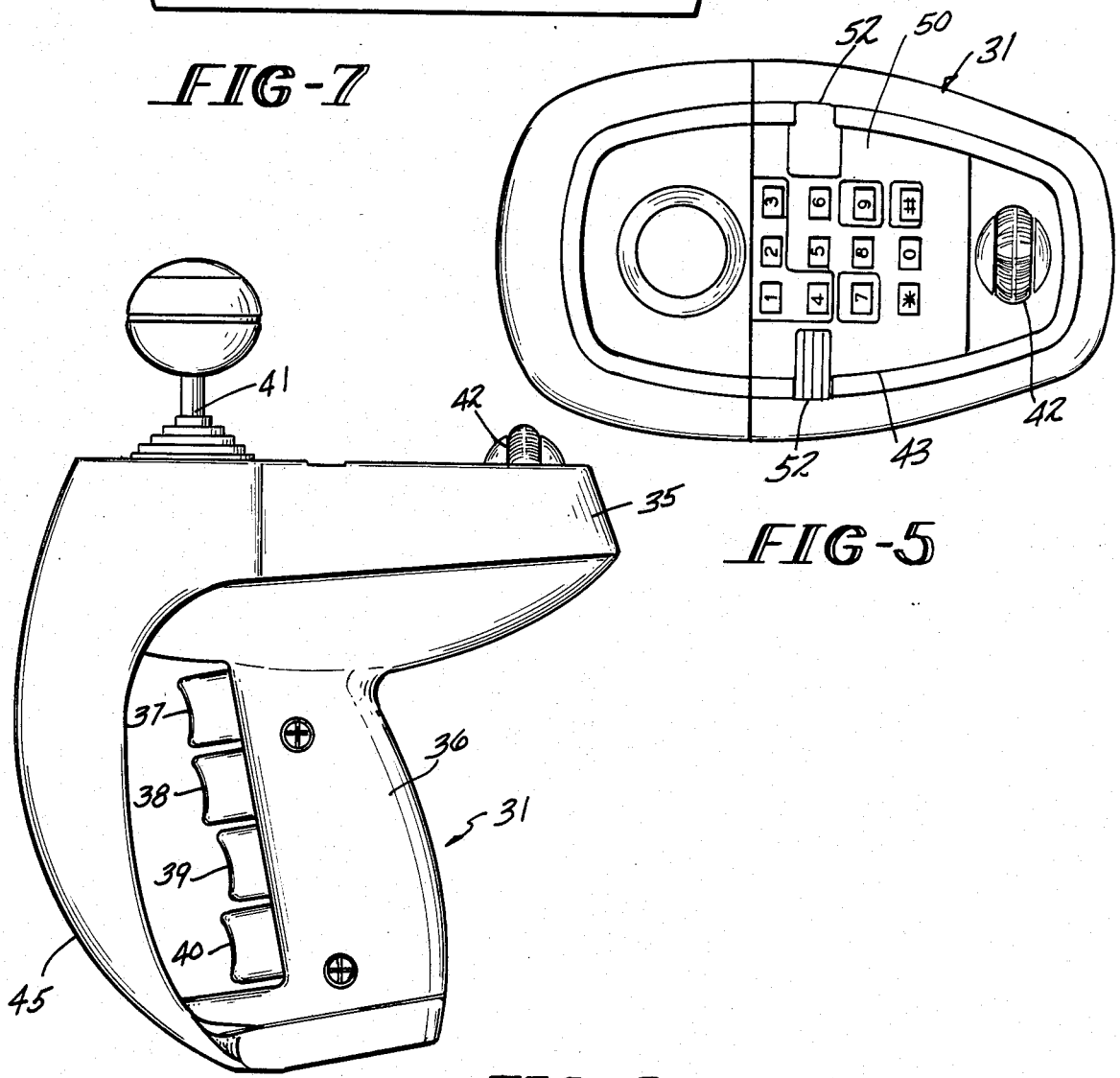
FIG-5
FIG-6

VIDEO GAME WITH INTERACTIVE ENLARGED PLAY ACTION INSERTS

FIELD OF THE INVENTION

This invention relates to video games and, more particularly, relates to a method of operating a video game with more than one playfield display where the playfield displays are related and changed as a function of game action.

BACKGROUND OF THE INVENTION

Video games basically comprise a microprocessor utilized as a central processing unit (CPU), a video display control, a game memory adapted to store a game program and a video memory for storing picture elements of a video display. The picture elements of a display are addressed and fetched from the video memory in accordance with the cathode ray tube (CRT) beam location.

In some cases, the system utilizes a full screen memory, that is, a discrete memory address is provided for every discrete display location of the display, either pixel position or line segment position. Such a system is disclosed in U.S. Pat. No. 4,301,503. In another type of system, a pointer indicative of a display location addresses and reads a picture element from a pattern library. Such a system is disclosed in U.S. Pat. No. 4,243,984. A video display processor (VDP), which together with a video random access memory (RAM) operates in this manner, is marketed by Texas Instruments Corporation as a 9928A video display processor.

A video game display may comprise discrete pixel positions, for example, of 256 positions per line and 192 lines. Thus, any object may be positioned on the screen by reference to a line and column location or a position representative thereof.

To create object movement on the display, in systems using a full screen memory, the addresses of the picture elements are changed periodically, usually during the time of vertical retrace of the display. To create object movement in systems of the second type, the object location in the pointer is changed to a new display location, and the pointer addresses the object in pattern or object libraries at the appropriate beam location.

In either case, the address of the object in the video RAM is changed by the CPU as it receives game player input as to movement of the object. Usually, a game player utilizes a joystick type instrument to control the direction of movement of an object. Such joystick may close switches indicative of coordinate directions of movement. Periodically, the CPU is responsive to the closure condition of the joystick switches. On this particular basis, or some factor thereof, the CPU will rewrite the address of a pattern or object in the video RAM. As the address of the object is periodically changed, the object appears to move on the video display in succeeding displays.

In these systems, movement of the object on the screen is at a rate determined by the game program. The object will move a predetermined number of pixels per display frame. In some games, rate of movement of an object may be variably selected or determined by a game player as disclosed in copending applications Ser. Nos. 430,351, filed Sept. 29, 1982, now U.S. Pat. No. 4,462,594, and Ser. No. 579,709, filed Feb. 13, 1984, now U.S. Pat. No. 4,552,360.

The present invention utilizes the foregoing techniques together with a new method of operating the game to interchangeably store different but related playfield displays in the video memory upon the happening of a given game event. Digital data indicative of at least two playfields are derived from a game memory device in the form of a replaceable game cartridge.

SUMMARY OF THE INVENTION

The invention in one form thereof comprises the placement in a game memory device of two or more playfields in which one or portions of one playfield are shown as inserts on the other playfield, simulating isolated play as seen in live telecasts of sporting events. The playfields are changed in response to given events or in certain instances to a player selection.

The invention is hereinafter described as embodied in a baseball game. Stored in the game memory device is a depiction of a full baseball field with all nine defensive players, most of which are movable by the defensive team. Also, stored in memory is a lifelike depiction of a pitcher and batter and isolated inserts of first, second, and third base, together with fielders and base runners, if any. When the ball is hit fair by a batter, coincidence of the bat and ball are detected and the display automatically switches to the full field for fielding of the ball and advance of the batter and base runners. When the ball is returned to the pitcher, the game switches back to the display of the pitcher, batter and the inserts. The switching between the two displays is responsive to a predetermined game happening; however, in at least one instance, a player can command a change of playfield display.

The invention is embodied in a video game comprising a microprocessor which is the central processing unit (CPU) of the system, a video display processor (VDP) having a random access memory which stores video display picture elements in addresses initially derived from a game program stored in a game cartridge read only memory (ROM), a system ROM which stores sub-routines and game player controllers which provide inputs to the CPU.

An object of this invention is to provide a new and improved method of operating a video game to present a plurality of related playfield displays which are functions of each other.

A further object of this invention is to provide an improved method of operating a video game to present different but related playfield displays as a given game event occurs.

The features of the invention which are believed to be novel are particularly pointed out and distinctly claimed in the concluding portion of the specification. The invention, however, together with further objects and advantages thereof, may best be appreciated by reference to the following detailed description taken in conjunction with the drawings.

BRIEF DESCRIPTION OF THE DRAWINGS

FIG. 5 is a plan view of a player controller;

FIG. 6 is a side elevation of the controller of FIG. 5;

FIG. 7 is an enlarged representation of an overlay which may be positioned over the key pad of FIG. 5.

DETAILED DESCRIPTION OF THE ILLUSTRATED EMBODIMENT

Figure 1:
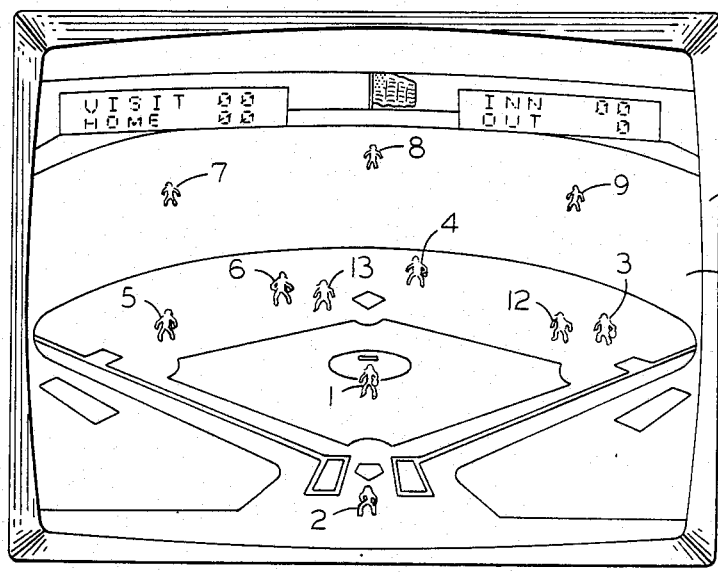
FIG. 1 is a representation of a video screen showing a first playfield display of a game embodying the invention.

FIG. 1 is representation of a video game display as seen on a television (TV) display. A display 10 of a playfield is shown on the screen of TV set 11 and as represented, the playfield is a baseball field showing essentially all of the field, with the exception of the extremes of the left field and right field foul lines. The playfield display 10 includes a pitcher 1, a catcher 2, a first baseman 3, a second baseman 4, a third baseman 5, a short stop 6, a left fielder 7, a center fielder 8, and a right fielder 9. On the playfield display as shown, there is also a runner 12 taking a lead off of first base, and a runner 13 taking a lead off of second base.

Figure 2:
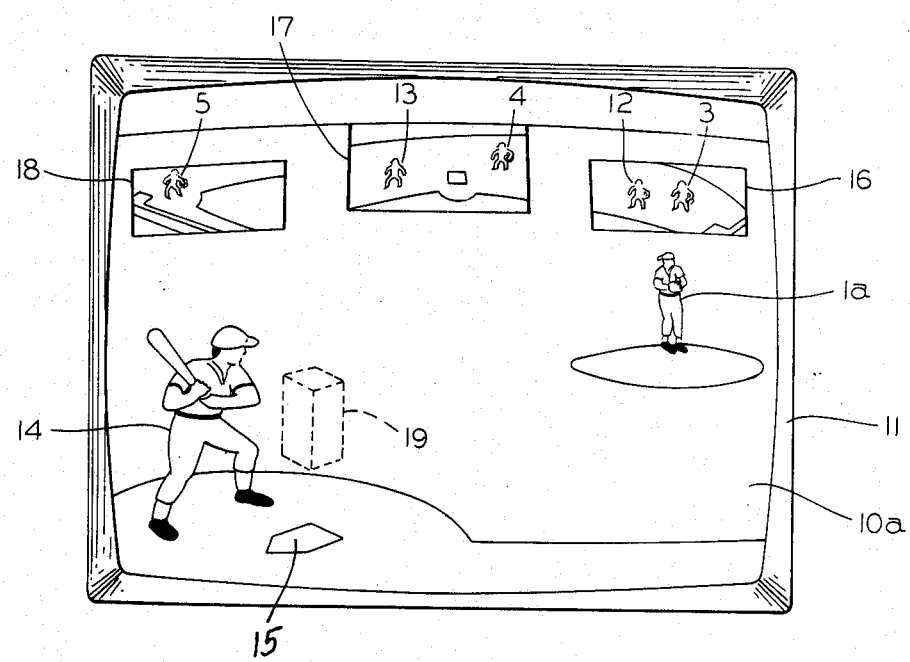
FIG. 2 is a representation of the same video screen of FIG. 1 but showing a second playfield display of the same game which depicts portions of the playfield display of FIG. 1 in isolation.

As will hereinafter be explained, the playfield of FIG. 1 will be presented on the screen when there is play action due to a baseball being hit, or the player in the position of defensive manager calls for a pick-off. The play condition on the display of FIG. 1 may be assumed to be a result of runner 12 making a hit or walking to advance runner 13 who was previously on first base. When the defensive manager determines that a particular play has ended, he will depress a switch signifying the return of the ball to the pitcher 1. Upon this occurrence, the display immediately switches to a second display 10a, as shown in FIG. 2 where the pitcher now designated as 1a is shown enlarged together with a batter 14 at home plate 15. The pitcher and batter are shown in perspective to better simulate a baseball game. Also shown on the playfield of FIG. 2 are isolated pictures 16, 17, 18 of the first base, second base, and third base areas, respectively, which show not only the infielders 3, 4, and 5 but the base runners 12 and 13. Thus, the playfield of FIG. 2 embodies isolated representations of portions of the playfield of FIG. 1.

Also represented in FIG. 2 is a ball-bat coincidence zone 19 shown in dotted line. If the game hereinafter described detects coincidence of a ball and bat in this zone, the game will determine the direction and projectory of the ball based upon several factors which are not important to a description of this invention. Only the detection of coincidence is of import. Detection of coincidence of the ball and the bat in the zone 19 will create a signal which will immediately change the playfield display of FIG. 2 back to the display of FIG. 1 and the players then manipulate their fielders and runners, the offensive team attempting to advance the runners and score, while the defensive team attempts to field the ball and throw out the runners.

Figure 3:
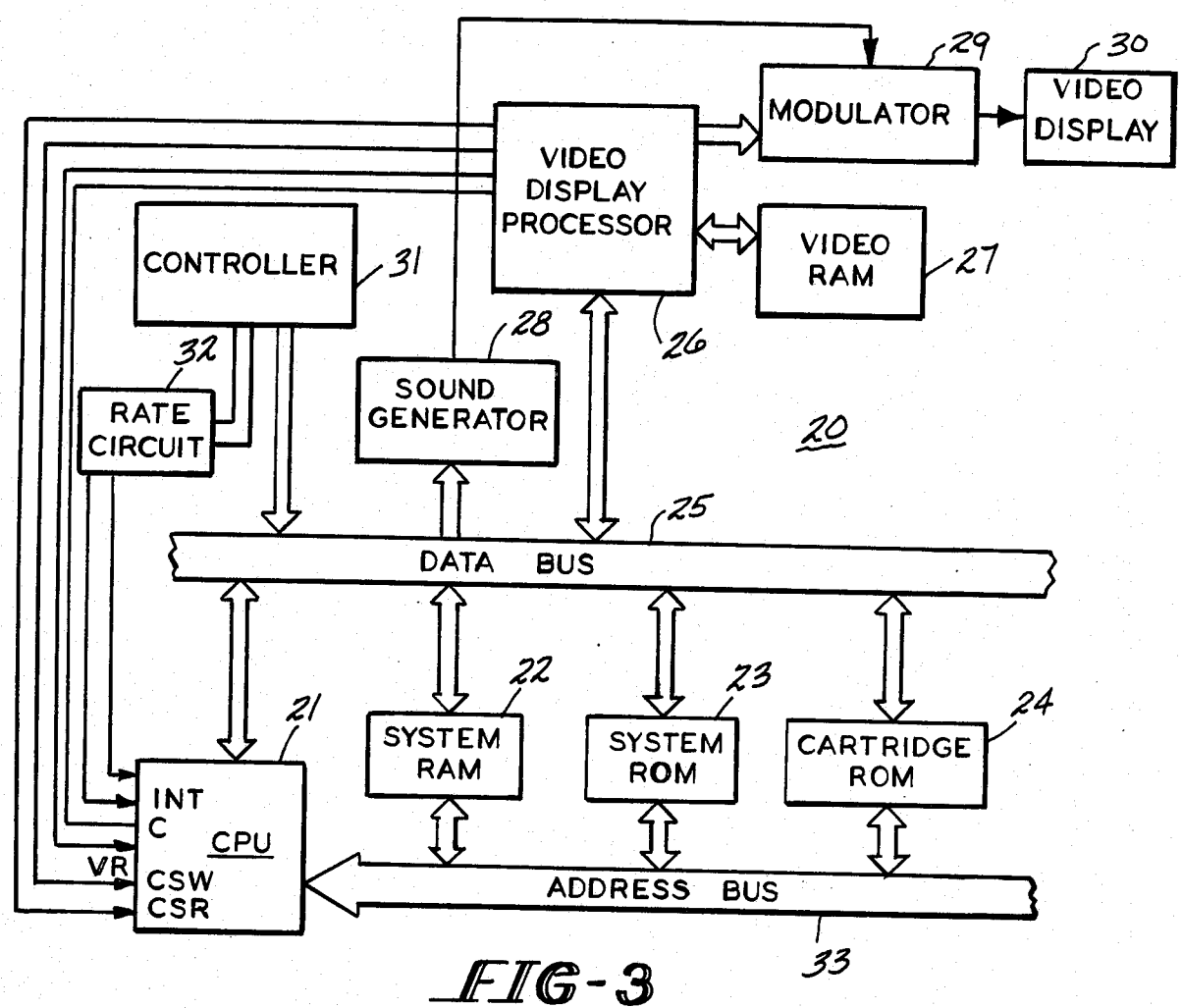
FIG. 3 is a block diagram of a video game system in which the invention may be embodied.

FIG. 3 exemplifies in block form a system 20 for creating video displays in which the invention may be embodied. The system comprises a central processing unit (CPU) 21, which may be a Zilog Z-80a microprocessor; a system random access memory (RAM) 22; a system read only memory (ROM) 23; and a game input memory device which may be a cartridge read only memory (ROM) 24. The CPU 21 accesses all commands and game programs and supplies data over a data bus 25 to a video display processor 26 (VDP). VDP 26 has associated therewith a video random access memory (RAM) 27 which is addressable by the CPU through VDP 26. The system also comprises a sound generator 28, which provides an input to a modulator 29. The modulator 29 receives a scan signal from VDP 26. The modulator applies a composite video signal to a video display 30, which is a cathode ray tube display, usually a home television set. Player operated controllers 31 (only one shown) supply information to CPU 21, indicative of directional motion of an object to be displayed, and/or alpha-numeric keyboard information. The controller includes a direction control in the form of a joystick, as disclosed in copending application Ser. No. 514,598, filed July 18, 1983, now U.S. Pat. No. 4,486,629 the disclosure of which is incorporated by reference. The controller includes a means for generating rate pulses which are applied to a circuit 32, which generates a pulse signal indicative of a player selected rate. This signal may be utilized independently or in conjunction with the player operated direction control, as disclosed in copending application Ser. No. 579,709, filed Feb. 13, 1984 now U.S. Pat. No. 4,552,360, the disclosure of which is incorporated by reference. The CPU 21 will periodically update video RAM 27 when permitted to do so by the video processor 26.

The system of FIG. 3 is exemplary of the hardware of a video game known as ColecoVision marketed by Coleco Industries, Inc. of West Hartford, Conn.

Cartridge ROM 24 is programmed to define specific video images for a particular game, and the game rules. System ROM 23 contains video processing sub-routines and controller input sub-routines. The system RAM 22 will contain temporary information peculiar to particular games as defined by the CPU, such as scores, position variables, position location of video markers, etc. CPU 21 periodically updates the image or elements of images in video RAM to be displayed in accordance with data from the controller and game program. The VDP 26 periodically permits the CPU to read from and write to the video RAM 27 upon occurrence of read (CSR) and write (CSW) signals. The CPU 21 addresses RAM 22, and ROM's 23 and 24, via an address bus 33. CPU 21 reads from RAM 22, ROM's 23 and 24, and writes to video RAM 27 via data bus 35.

At the end of every video frame display, VDP 26 provides a video refresh signal VR to CPU 21. This occurs about every one-sixtieth of a second. This may be utilized as a clock signal. Circuit 32 generates a rate signal as selected by the game player and supplies such rate signal to an interrupt terminal (INT) of CPU 21. When this occurs, CPU 21 will determine the rate, and establish a numerical representation thereof, and determine direction. Information is now stored which comprises a binary number indicative of rate as a function of the VR signal and direction of movement of a game object. This information or any part thereof may then be utilized to update the video display in accordance with the game program.

The joysticks of controllers 31 are adapted to close one or two of four switches which are ninety degrees apart to define eight directions of movement. Responsive to switch closure, the CPU 21 changes the addresses of one or more picture element patterns in video RAM a predetermined number of pixel positions per frame of display in accordance with the game program, or at a different rate in accordance with a velocity selected by a game player.

Figure 4:
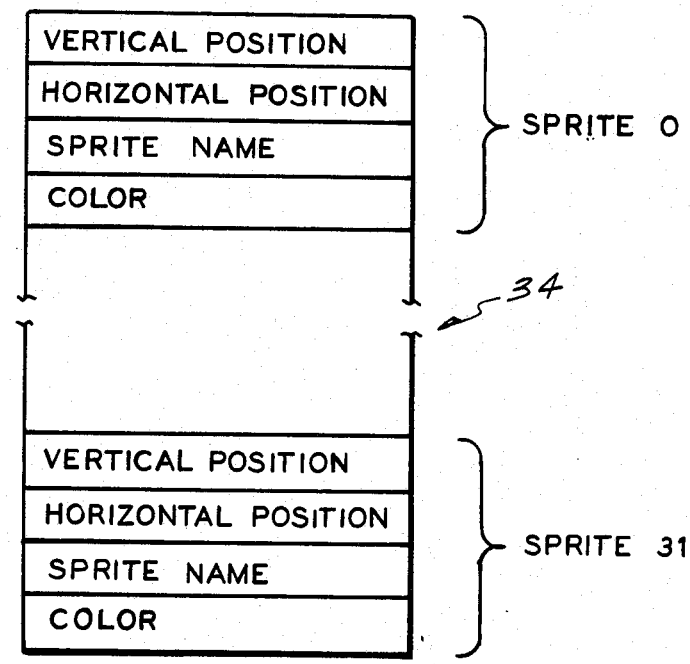
FIG. 4. is a representation of a portion of a video random access memory utilized in the system of FIG. 3.

The video display processor is preferably a Texas Instruments Incorporated 9928A Video Display Processor, which is described in U.S. Pat. Nos. 4,243,984 and 4,262,902. In this system, movable objects are termed "Sprites" and are identified as shown in FIG. 4 in a sprite attribute entry in a sprite attribute table 34 in video RAM 27. The video RAM contains all video display data in blocks of eight columns of eight bytes (or 8 × 8 pixels). These blocks may be pattern blocks or sprites. Sprites are animation patterns which provide smooth motion and multi-level pattern overlaying. The sprites are prioritized by planes. In the identified VDP, there are thirty-two sprite planes followed by a pattern plane. The location of a sprite on the screen is defined by coordinates specifying the location of the top lefthand pixel coordinate. A sprite can be moved pixel by pixel by redefining the sprite origin. The sprite planes are transparent outside of the sprite itself.

Each sprite has an attribute table entry which gives vertical coordinate position, horizontal coordinate position, sprite name or number, and sprite color pattern. The sprite name or number is a pointer to a sprite pattern in a sprite pattern generator table or library in video RAM 27. A similar sprite, attribute entry (less color) is maintained in an object coordinate register in CPU 21 or RAM 22. The coordinates of the sprites in CPU 21 or RAM 22 are varied by operation of a player controller 31 and the CPU writes the new coordinates in the sprite attribute table in video RAM 27. When the display beam location coincides with, or approaches vertical and horizontal attributes of a sprite, the name pointer is used to address the particular sprite in the sprite library for display. A plurality of sprites or objects which are a composite of two or more sprites may be moved by a game player.

FIGS. 5 and 6 exemplify a player hand held controller 31 utilized in conjunction with the invention. Controller 31 is disclosed and claimed in copending application Ser. No. 579,711, filed Feb. 13, 1984, now abandoned.

Controller 31 comprises an upper housing 35 from which extends a pistol grip handle 36. Player operated means for selecting one or more game objects for movement in the form of four action buttons 37-40 extend from the finger side of handle 36. Buttons 37-40 are preferably color coded. Mounted in housing 35 is a joystick type direction controller 41 which may determine direction of movement of a sprite or some other function dependent on the game program. Joystick 41 and associated contacts (not shown) comprise a means for selecting direction of movement of game objects or control of some other game parameter. Rotatably mounted in housing 35 is a spinner 42 which permits a game player to control the rate of movement of a sprite or other game marker. Both joystick 41 and spinner 42 are supported in housing 35 and extend through an upper wall 43 thereof (shown as extending through an overlay 50). A plurality of switch actuating buttons, which may be labeled the same as the keyboard of a touch tone telephone, also extend through upper wall 43. The buttons may be utilized to select a function such as game start, skill level, repeat game, etc., and other game parameters, as hereinafter described.

A front reinforcing member 45 which also provides an asthetic appearance extends from the front of housing 35 to the bottom of handle 36.

FIG. 7 exemplifies an enlarged overlay 50, which fits on the upper wall 43 of controller 31. The overlay 50 has tabs 51 which fit into locating recesses 52 on controller 31. The overlay 50 is for a particular game known as ColecoVision, Super Action, Head to Head Baseball. When the display is as shown in FIG. 2, the defensive player will pick a pitch speed by depressing one of the buttons shown in outline 54 and will select the type of pitch by one of the action buttons 37-40. The legend for the particular action button is shown in block 55. In this game, the action buttons 37-40 are color coded. Shown in block 56 is a color code of the four infielders, catcher, and three outfielders, which are color coded to correspond to the colors on action buttons 37-40. Note the shortstop is selected by depressing buttons 38 and 39. (Color code not shown in FIG. 7.)

In this baseball game, the offensive player cannot change the playfield display. Change of the playfield display occurs in the following instances.

When a pitch is thrown the offensive player will control the swing, i.e. high, low, inside, outside and intermediate points, of the batter by manipulating the joystick of his controller.

At this time, the display is as shown in FIG. 2. VDP 26 includes a sprite coincidence detector. Both the ball and the batter's bat are sprites. If the VDP detects coincidence of the bat and ball sprites in the volume 19, the VDP immediately supplies a coincidence signal to CPU 21. CPU 21 then immediately changes the playfield data in video RAM 27 by writing therein data for the display of FIG. 1 in video RAM 27 and the display changes to that of FIG. 1.

The defensive player now manipulates his controller to cause the defensive sprites to field the ball, while the offensive player manipulates his controller to cause the former batter and base runners to advance. At the end of a play, the defensive player depresses the keypad button eight (Return) of his controller. This supplies a signal to CPU 21 calling for the display of FIG. 2. CPU 21 will then read the data for the display of FIG. 2 from the cartridge RDM 24 and write such display data into video RAM 27. Then during the next display frame of the video display, the date for the display of FIG. 2 will be displayed.

The defensive player now selects the type of pitch and speed from keys in block 54 and action buttons 37-40. The offensive player selects a swing, high, low, inside or outside, by means of the joystick 41 on his controller.

If coincidence is detected in zone 19 between the bat and the ball, the VDP 26 applies a signal C to CPU 21. CPU 21 then again reads the data in ROM 24 indicative of the display of FIG. 1 and loads this data into video RAM 27 through VDP 26 and the playfield display is changed to that of FIG. 1.

The batting team may cause base runners to take a lead by depressing the STEAL button on the key pad as indicated in FIG. 6. Then by manipulating spinner 42, the runners may be made to either take a lead or return to base. Prior to a pitch being thrown, the defensive player may depress a PICKOFF button (FIG. 7). When this occurs, a signal from the defensive player's controller is applied to CPU 21, causing the CPU to read data indicative of the display of FIG. 1 from ROM 24 and load this display data in the video RAM 27. Thereafter, when the pickoff play is over, the defensive player depresses the RETURN button, the ball returns to the pitcher and a signal is given to the CPU 21 to cause it to read ROM 24 and load video RAM 27 with the data for the display of FIG. 2.

When the display changes from FIG. 2 to FIG. 1, all defensive players always initially appear in the same locations, prior to manipulation for movement by the defensive player. The defensive player selects a player for movement by depressing one or more of action buttons 37-40, and selecting the direction of motion through joystick 41. After fielding the ball, an action button 37-40 indicative of a base is depressed and the fielder throws to that base. The action buttons 37-40 have different functions dependent on whether the player is on offense or defense and the status of a particular play, for example, whether the ball is in the outfield or infield.

If a play has been completed and there are men on base, when the display changes from FIG. 1 to FIG. 2, the CPU or RAM 22 stores an indication of this in its sprite attribute registers, then transfers this data to video RAM 27, together with the data for the display of FIG. 2 from ROM 24 which may include offset coordinates for the base runners to appear in the isolated inserts 16, 17, and 18. The base runners initially appear on the bag. The offensive player may press the STEAL button (FIG. 7), manipulate spinner 42 and cause one or both runners to take a lead by depressing the appropriate action buttons 37-40. The motion of the base runners will be seen in inserts 16, 17 and/or 18 as the case may be. In FIG. 2, the offensive player has caused the runners on first and second base to take a lead.

Figure 8:
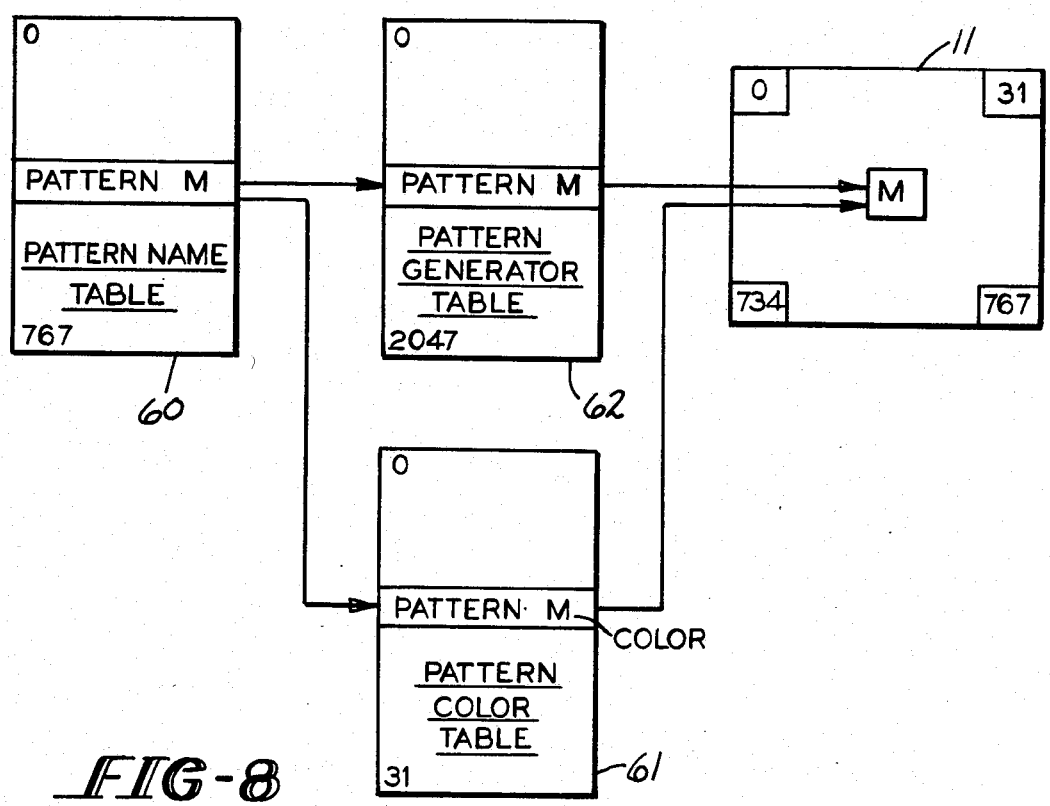
FIGS. 8 and 9 are representations of a video random access memory utilized in the game of FIG. 3.
Figure 9:
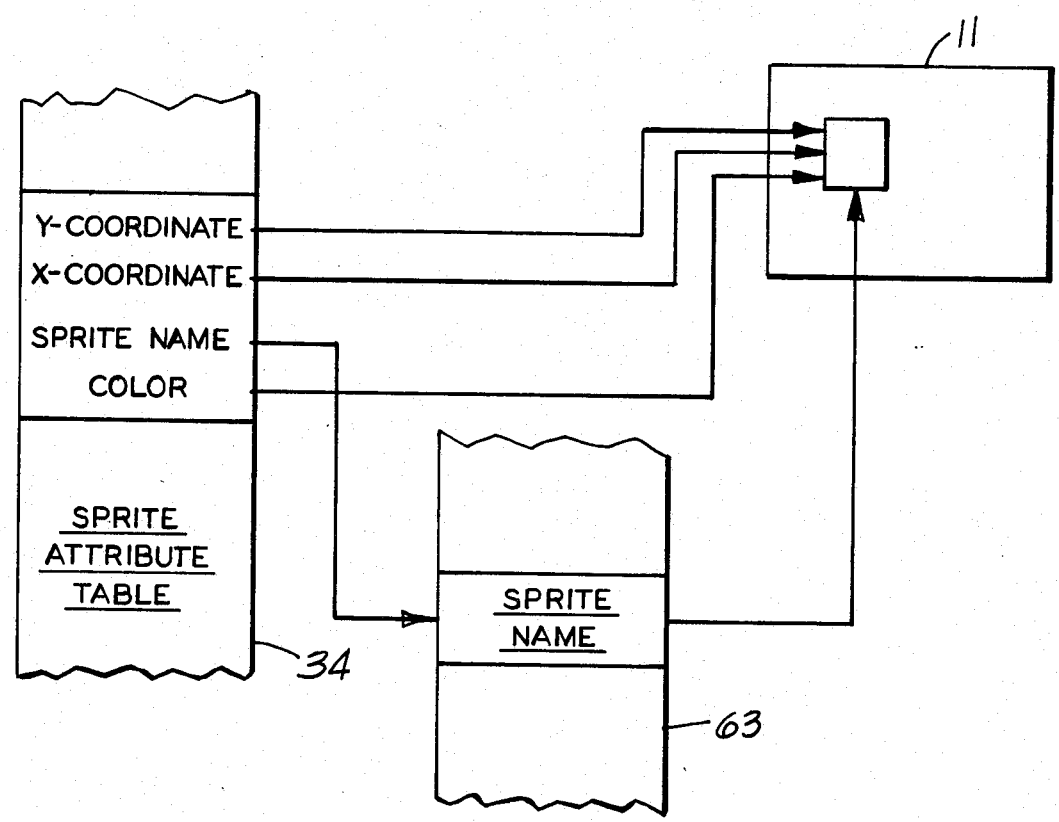

Reference is now made to FIGS. 8 and 9. The video RAM 27 contains a multiplicity of tables which determine the placement of pattern blocks on the video display. A pattern name table 60 has entries (768 as shown) of the coordinate locations of each pattern block and the name of the pattern. The pattern name table is responsive to the CRT beam position to point to a pattern in a pattern generator table 62 and a pattern color table 61 to define a pattern block on the screen. The pattern generator table may contain up to two hundred fifty-six (2048/8) patterns which are repeatable, as fetched by the pointer from pattern name table 60.

The sprites are fetched for display from a sprite pattern register or library 63 as the beam approaches the sprite position as determined from the sprite attribute table 34. A pattern color table 61 responsive to the sprite name in table 60 stores a color for each pattern.

The VDP 27 includes a sprite coincidence detector which senses when two sprites occupy the same location or have a predetermined offset. In the exemplified game the pitched ball and the bat are sprites. If the bat strikes the pitched ball in zone 19 of FIG. 2, the VDP sprite coincidence detector applies a signal to the CPU 21. The CPU then reloads the vido RAM through VDP 26 with data from the game memory device for the display of FIG. 1.

When the beam position counter of VDP 26 is close to a pattern location stored in the pattern name table 60, the pattern name, for example "M", is used as a pointer to the pattern generator table 62, and also the pattern color table 61. The pattern and its color are then fetched and placed into temporary storage, then shifted out of temporary storage at the specified beam location. As shown in FIG. 8, a pattern "M" has been positioned essentially centrally of the display on screen 11. In FIG. 8, the screen 11 is shown as having the information loaded into video RAM 27 is initially in the cartridge ROM 24. The CPU will read the cartridge ROM, load in the pattern locations in the pattern name table, the patterns in the pattern generator table and the specified colors in the pattern color table. The patterns are defined in 8×8 pixel blocks or eight bytes of eight pixels each, and normally do not move, however, movement of patterns may be programmed.

As shown in FIG. 9, the video RAM 27 also includes a sprite attribute table 34 in which the attributes of each sprite are stored and a sprite generator table 63 where the sprite patterns are stored. When the CRT beam approaches a sprite location, the sprite name is used as a pointer to the sprite generator table to select the sprite pattern for display. The sprite pattern is then placed in temporary storage and shifted out in synchronism with the position of the beam. Initially, the sprite attribute table 34 and the sprite generator table 63 of the video RAM 26 are loaded with the sprite attributes and the sprite patterns by CPU 21 reading this information from the cartridge ROM 24.

In mapping the display as indicated by the arrows in FIGS. 8 and 9, the patterns and sprites are read out from storage in the video RAM in accordance with the position of the cathode ray tube beam.

Each time there is a display change from the display of FIG. 1 to FIG. 2, and vice versa, as previously stated the elements of the display will always come back in fixed positions. Thereafter, the sprites may be manipulated by the game players through controllers 31 in accordance with the game rules.

The positions of the sprites which are base runners are held in the previously described register in CPU 21 or system RAM 22 and therefore will not be lost on a change of playfield display.

It may thus be seen that the objects of the invention set forth, as well as those made apparent from the foregoing description, are efficiently attained. While an embodiment of the invention has been set forth for purposes of disclosure; however, modifications to the disclosed embodiment, as well as other embodiments thereof, may occur to those skilled in the art. Accordingly, the appended claims are intended to cover all embodiments of the invention and modifications to the disclosed embodiment which do not depart from the spirit and scope of the invention.

What is claimed is:

1. A method of operating a video game which comprises a video display processor and a video random access memory, said processor including means for addressing said video random access memory to read display elements therefrom for display on a video screen, a central processing unit communicating with said video display processor, a replaceable game memory device readable by said central processing unit, said game memory device containing digital data indicative of at least two playfield displays for the video game, said central processing unit being in communication with said game memory device to transfer display data therein to said video random access memory, and player controller means connected to said central processing unit for control of movement or objects on the video display, comprising the steps of storing in said game memory device digital data representative of at least two related playfield displays where one playfield display depicts portions of the other playfield display, transferring data indicative of one playfield display from said game memory device to said video random access memory for display, sensing a first game event in one of said displays and transferring data indicative of a second display from said game memory device to said video random access memory for display, and sensing another game event in said second display and transferring data indicative of said one of said displays to said video random access memory, at least one of the sensing steps being in response to a game player selection made by a game player through said player controller means.

2. The method of claim 1 wherein the playfield display depicting a portion of the other display depicts said portion in at least one isolated block.

3. The method of claim 2 where a movable game object is displayed in said isolated block corresponding to a movable game object of the other display.

4. The method of claim 1 where one of said sensing steps is coincidence of game objects.

5. The method of claim 1 wherein one of said displays is a baseball field showing all defensive players, and the other of said displays is an enlarged pitcher and batter together with isolated inserts of the areas about first, second and third bases.

6. The method of claim 5 where base runners, if any, are shown on both of said displays.

7. The method of claim 5 where base runners, if any, are shown in said isolated inserts.

8. The method of claim 1 where at least one of said playfield displays show movable objects, and using said player controller for selecting an object for movement and causing movement of the selected object.

9. The method of claim 8 further including the step of controlling the rate of movement of the selected object.

* * * * *